8106X
J. V. A. Wemple,
Horse Power.
Patented Mar. 25, 1834.
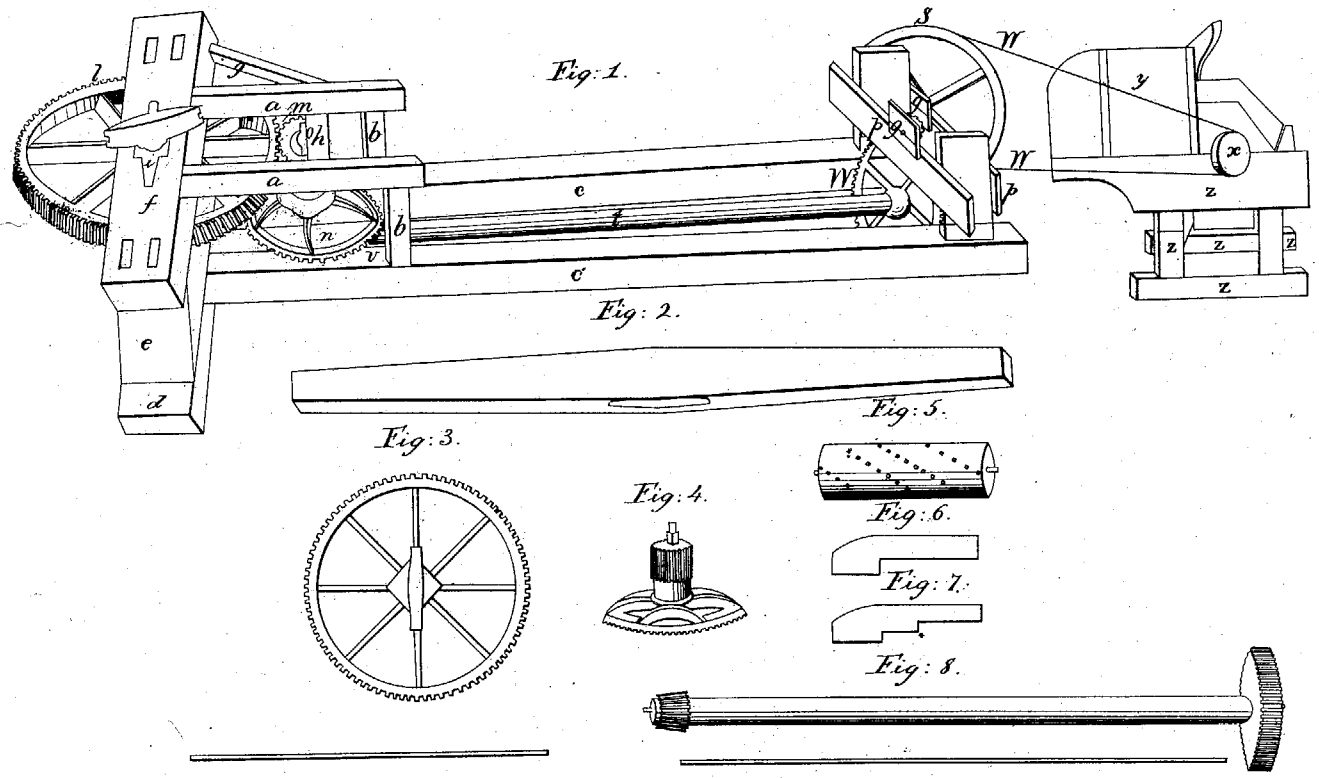

Jacob V. A. Wemple, of Florida, N. York.
Letters Patent

The schedule referred to in these Letters Patent, and making part of the same, contain-
ing a description in the words of the said Jacob V. A. Wemple himself of his improvement in
the machine for thrashing grain & also in the construction & formation of a horse power
for propelling said machine -

---

To all to whom these presents shall come: Be it known that I Jacob V. A. Wemple of the
town of Florida in the __ of Montgomery & State of New York have invented a new & useful
improvement in a machine for thrashing grain - and the horse power operating said machine
which horse power may be applied to all other uses & purposes to which horse power usually is
or may be applied - and that the following is a full description of the construction & opera-
tion of said machine & horse power as invented or improved by me - The machine is construct-
ed with a frame four feet long two feet ten inches wide & two feet two inches high made
with four posts three inches thick & six inches wide two plates three inches thick & nine inches
wide, two sills three inches square - three girts or cross timbers three inches square -
A circular or concave bed two feet & four inches long which is to be made of hard wood
plank eight inches wide & three & a half inches thick faced with sheet iron & tenoned into
the plates or may be set on spiral springs & a cylinder of solid hard wood two feet three &
a half inches long & nine inches in diameter or larger if thought proper bound with
sheet iron, with an iron shaft running thro' the center of it an inch & a quarter square
with a bed ring at each end of the cylinder: one end of the shaft projecting far enough
to receive or whir of about five inches diameter - The ends of the cylinder are secured with
iron bands - The cylinder is to run in cast iron boxes counter sunk in the center about
three fourths of an inch & filled up with zink for the bedrings - The boxes are in two pieces
confined to the plates by means of iron bolts - In the upper half of the box is a reser-
voir with a small hole thro' from the bottom of it to the shaft to contain oil for oiling
the bearings - The teeth in the concave are an inch & a half long to the first shoulder,
an inch wide at the shoulder & half an inch at the end three eighths of an inch thick
at the shoulder & one fourth of an inch at the end & the edge opposite the shoulder being
the part which strikes the grain should be rounded to prevent its cutting the grain -
The shank of the teeth is four inches in length two inches of which is only one fourth of an inch square with a flat point & is the part that is drove thro the concave & clinched on
the under side - The teeth in the cylinder are the same as those in the concave except the
shank which is thee inches long three quarters of an inch wide & three eighths of an inch
thick - The distance from center to center between the teeth in both the concave & cylinder is
one inch & they are placed in such a manner that the teeth of the cylinder pass thro' betwen
those of the concave leaving a space between the teeth as the cylinder revolves of an eight
of an inch - In the cylinder are seventy five teeth set in rows running half way around
it in a spiral form & placed in such a manner as to break joint -
In the concave there are fifty two teeth set in four rows running lengthways of said con-
cave also set in such a manner as to break joint - The cylinder is covered with a wooden
cap into the ends of which is grooved diagonally a strip of a board about three & a half
inches wide which forms a fender that prevents the dust from driving back up the throat
of the hopper - This feeder with an opening left in the cap next to the hopper forms the
dust discharger - On the frame of the machine there is constructed a hopper or feeding
table with a throat to receive the grain, one side of the hopper is seventeen inches high in
order to prevent the grain from catching on the strap or band: the other side is only seven
inches high - The improvement which I claim in the above thrashing machine as my
invention is the formation of the teeth & the construction of the dust discharger, also the
lining of the boxes with zink - The description of the horse power above mentioned is as
follows - The frame is made by tenoning two sills thirteen feet long & six inches square
into a cross sill six feet long, six inches thick & ten inches wide -
The long sills are seventeen inches apart where they are tenoned into the six feet sill & at
the other end they are twenty two inches apart - In the six feet sill near each end is a
post thirteen inches long double tenoned which pass in a cap piece six feet long ten inches
wide & five inches thick & in said cap piece & directly over the long sills are framed two
plates four feet long & four by five inches square supported at the other end by two posts
thirteen inches long framed into the long sills. There is a brace from the plate to the cap
piece & also from this same plate an iron brace to the long sill on the opposite side se-
cured by bolts. said frame contains the following gearing, one cast iron crown wheel three
feet in diameter with spur gearing four inches wide & a cast iron shaft four inches
square & twenty inches long standing perpendicular which said shaft steps into a box
in the center of the six feet sill & has a neck passing thro' the cap piece which is confined
by two half boxes with keys, on the top of this neck is a head fourteen inches long five inches high & three inches acrofs in the center tapering to an inch at the ends & in each end of the head is a notch to receive a bolt for securing on it a lever which is let on by means of a mortise in the center – The lever is twenty feet long & eight inches square in the center tapering to three inches at the ends – The said crown wheel mashes into a seven inch pinion on another upright shaft of wrought iron seventeen inches long & two inches square, which shaft steps into a box let into a crofs sill tenoned into the long sills, & runs at the top into a box bolted on a crofs girt which is tenoned into the two plates –

The shaft of the pinion wheel is regulated by keys to the crofs girt & sill so as to mash in & out with the crown wheel as may be necefsary – on the shaft of the pinion wheel is also a bevil wheel of cast iron two feet in diameter which mashes into a six inch pinion wheel on a wooden shaft five inches in diameter & nine feet long lying horizontal between the two long sills & runs in boxes bolted on the cross sills which are tenoned into the long sills – on the other end of said shaft, is another cast iron wheel twenty-two inches in diameter with spur gearing two & a quarter inches wide which mashes into a three inch pinion on a shaft of wrought iron an inch & a quarter square & sixteen inches long with two bearings of two inches each eight inches apart the end of the shaft projecting four inches beyond the bearing to receive a band wheel two feet four inches in diameter –

The band wheel is made with wooden arms three inches square locked across each other & fellies three inches wide for the band to run on – The shaft runs in boxes like those of the cylinder in the thrashing machine & is supported by framing two posts nine inches wide & two inches thick into the large sills, & two girts locked into the posts & secured by iron bolts pafsing thro' the whole together –

The horizontal shaft has a bridge over it confined on the long sills for the horses to pafs over on – The long sills for convenience should be sunk to a level with the surface of the ground – The same motion may be given to the machinery by using a converge wheel, instead of the crown wheel – The wheels in the gearing may be enlarged or diminished to such sizes as may be necefsary –

I claim as my invention or improvement in the above described horse power the construction of the frame & the application of the gearing –

Witnesses

John McMillan }
James Nochees }

Jacob V. A. Wemple

Drawing [illegible]

[illegible]